(12) United States Patent
Raman

(10) Patent No.: US 7,533,186 B2
(45) Date of Patent: May 12, 2009

(54) INTEGRATED SECURITY FRAMEWORK

(75) Inventor: Anant Raman, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1072 days.

(21) Appl. No.: 10/883,351

(22) Filed: Jun. 30, 2004

(65) Prior Publication Data

US 2006/0021030 A1    Jan. 26, 2006

(51) Int. Cl.
*G06F 11/00* (2006.01)
(52) U.S. Cl. .................. 709/239; 709/224; 709/238; 715/735; 715/736
(58) Field of Classification Search .......... 709/238, 709/239, 224; 715/734, 735, 736; 726/22, 726/25
See application file for complete search history.

(56) References Cited

U.S. PATENT DOCUMENTS

| 7,222,190 | B2 * | 5/2007 | Klinker et al. ............ 709/238 |
| 7,299,489 | B1 * | 11/2007 | Branigan et al. ............ 726/2 |
| 2002/0018449 | A1 * | 2/2002 | Ricciulli ................... 370/268 |
| 2006/0107313 | A1 * | 5/2006 | Crowley et al. ............. 726/6 |

* cited by examiner

*Primary Examiner*—Kenneth R Coulter
(74) *Attorney, Agent, or Firm*—Blakely, Sokoloff, Taylor & Zafman LLP

(57) ABSTRACT

A method and apparatus for an integrated security framework. An embodiment of a method comprises identifying network paths for a system; identifying products and platforms for the system; applying application security for the system; analyzing security status for the system; and, based at least in part on the analysis of the security status, automatically identifying changes for the network paths for the system or the products and platforms for the system.

18 Claims, 6 Drawing Sheets

INTEGRATED SECURITY FRAMEWORK

FIELD

An embodiment of the invention relates to security systems in general, and more specifically to an integrated security framework.

BACKGROUND

In all types of system or enterprise operations, security is a major issue that is becoming increasingly important. The introduction of distributed computer access to systems, while providing great benefits, also creates numerous risks. Unauthorized accesses to systems can potentially cause sizeable losses.

In one example, semiconductor manufacturing has become more efficient and effective, allowing tools to be remotely access by system users. The remote access is useful to offset the large support costs. However, remote access for semiconductor manufacturing also implies that there are new requirements for security.

Conventional systems do provide for security measures in operations such as semiconductor manufacturing, but conventional security does not necessarily provide a solution that responds appropriately to changes. For example, in a conventional system, security often involves network paths (NP), products and platforms (PP), application security (AS), and business process (BP). However, the individual components of security generally do not work together in unison, thus resulting in less than adequate security in a modem environment.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
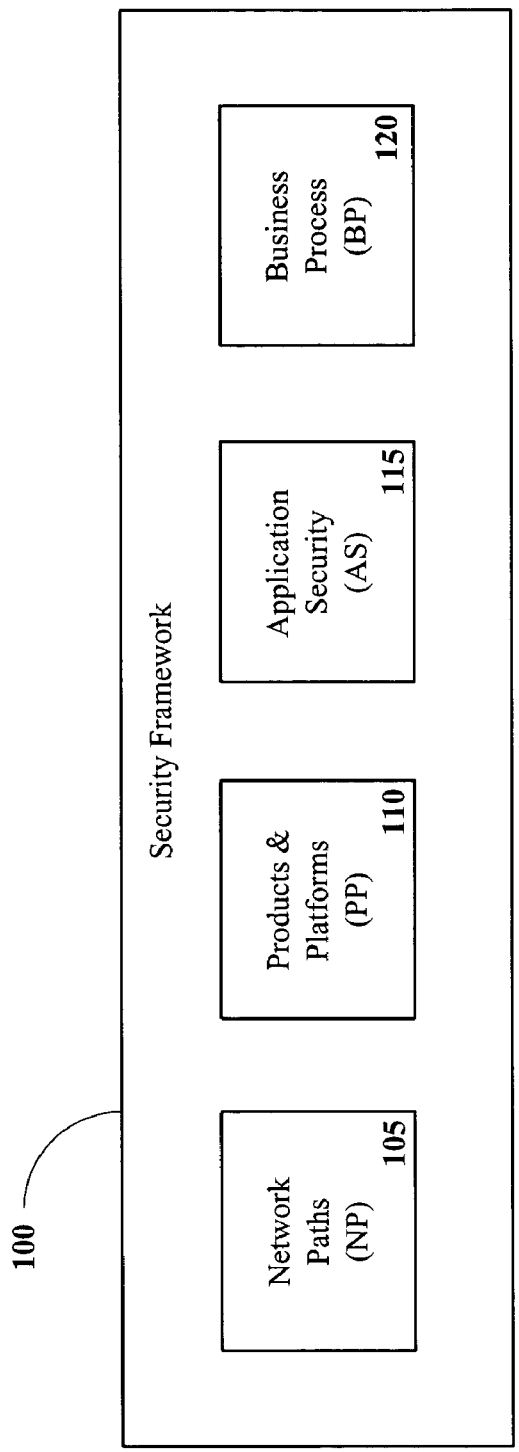
FIG. 1 illustrates an embodiment of security elements.

A method and apparatus are described for an integrated security framework.

According to an embodiment of the invention, an integrated framework provides security for a system or enterprise. Under an embodiment of the invention, a system or enterprise includes semiconductor production systems. A system may include a distributed systems environment of semiconductor process equipment and related shop floor systems.

Under an embodiment of the invention, a method for providing security includes four elements or cornerstones of security, such elements being network paths, products and platforms, application security, and business process. Under an embodiment of the invention, a feedback loop is generated to ensure security. In one embodiment, the feedback loop provides for feedback from dynamic security elements to static security elements.

The reality of designing and enforcing security is that compromises are inevitable because products and platforms have software defects, and human elements may work against the process. Based on how a system is configured and used, an embodiment of the invention can first determine the overall security of the system. If system security can be improved, improvements can be identified and subsequently implemented. If business needs dictate that a flawed system needs to be used (because, for example, there is no substitute available in the given timeframe) then improvements to business practices may also be identified and implemented to shore up weak security elements.

Under an embodiment of the invention, security is required for an integrated system of networks, firewalls, servers, software, and users. In an embodiment, an integrated security system is utilized to identify an appropriate combination of elements to provide security.

Under an embodiment of the invention, a security framework includes a static security sector or subsystem and a dynamic security sector or subsystem. In an embodiment, the static security sector comprises identifying exclusive paths and identifying products and platforms. Under an embodiment, dynamic security sector comprises applying application security and the business process.

Elements of a security system may be structured as follows:

(1) Identifying Exclusive Network Paths—Under an embodiment of the invention, an initial process taken for the purpose of providing security for a system is identification of network paths between users and the system. Networks typically allow connections from multiple resources to multiple destinations. Under an embodiment, a network may be scaleable, possibly without limitation. To secure a system, it is necessary to ensure that only authorized users can access the system and to ensure that all unnecessary accesses to the system are denied. Possible network paths may include the Internet, which implies that network paths may traverse through multiple firewalls and "demilitarized zone" (DMZ) segments.

(2) Identifying Products and Platforms—Under an embodiment of the invention, a system includes clients and servers with operating systems, data sources, network connections, firewall rules, and users with varying degrees of authority. Security of a system can be enhanced by ensuring currency of operating systems and providing products with hardening, which are supplemented by secure network configurations such as private VLANs (virtual local area networks), access control lists, firewall rule sets, and other such elements. Selecting the most secure products and platforms practicable, keeping the products and platforms updated, and placing the elements appropriately in the system with exclusive access is fundamental to securing systems.

(3) Applying Application Security—If the system was not actually used, then static security elements would be sufficient to protect a system. However, in practice users use applications over a network to create, access, modify, and transform information. Under an embodiment, security needs of operational systems are augmented by a dynamic security element. Application security is truly dynamic, existing for as long as user sessions are active. Applying application security addresses the authenticity of users, provides users with a list of applications users are authorized to use and the approval required for the given task at hand. Application security also facilitates the need to access data in addition to the confidentiality and message integrity requirements based on the security classification of data; and other related concerns.

Under an embodiment of the invention, applying application security also comprises inactivity timeouts, reconnections to a system, and proper usage of temporary data stores. Further, choices of network protocols, encryption and message integrity algorithms, and strength and location of processes (such as application layer security versus network layer security) are also important elements. Logging operations (to record or log system activity) are widely accepted as important enablers of audits and security incident tracking (such as computer forensics).

Under an embodiment of the invention, if the overall system security status is not deemed sufficient at the end of application security with the cumulative effect of the first three elements (identifying exclusive network paths, identifying products and platforms, and applying application security), then system design and operation enters an iterative process to feedback security issues and reformulate security requirements. The outcome of a determination of inadequate security may result in varying responses, depending on the severity of the security lapses and the particular embodiment. In one embodiment, severe security issues may result in a choice of alternative set of products and platforms (such as operating systems, software products or network connection types), which may require termination of operation for the purpose of installation. In another embodiment, network paths may be adjusted or "tweaked" to secure weaker products or platforms, thereby adding "defense-in-depth" through certain stronger requirements. In one example, a question of security of a connection may result in an additional requirement for encryption of data. Under an embodiment of the invention, a system may automatically impose certain security changes in the iterative process.

(4) Business Process—If the application security is adequate, then business practices may follow. Because human lapses are most often the weakest link in a chain of security, several categories of business processes may be required to reinforce security. For example, the registration process for user credentials my require audits to ensure that high ethical standards are followed. Complementary checkups of the authorization systems may reveal what actions users are not supposed to take and should be prevented from taking, but that can taken in reality. Frequent audits of computer and network configurations are required to ensure conformance to network and system security policies. Further data classification is a dynamic process and the mapping of data to access control has to be evaluated constantly. Business is ever changing with people, roles, functions, tasks, and other issues, thereby requiring that security operations be constantly alert and responsive. Under an embodiment of the invention, security weaknesses of various components of a system are constantly evaluated, with focus being provided on attainment of overall system security via application and system use-cases.

Under an embodiment of the invention, iterative evaluation of a security system can be used as a tool during testing and evaluation of security processes and products. The iterative process allows comprehension of how the system responds to security changes, thereby providing a valuable tool to analyze security-related system changes.

Under an embodiment of the invention, the iterative process of a security system may also provide notices and alarms to system attendants regarding required changes in business practices. In an embodiment, if an evaluation determines that the system requires additional security, in addition to any other actions taken, the system may provide instructions or suggestions for human operators regarding modifications of or additions to security-related business practices. For example, a system may inform human operators regarding questionable operations, and thereby, indicating the need for audits of certain system sectors are needed, that certain types of access requests should be scrutinized, or that certain users should lose or have reduced access privileges. Under an embodiment of the invention, a system automatically provides instructions to human operators regarding needed changes in business practices to shore up security concerns.

Under an embodiment of the invention, an integrated security framework is implemented to attempt to fully provide comprehensive cyber security. Under an embodiment of the invention, a security system is intended to address the entire system and provide global and integrated solutions, rather than being limited to individual elements of security and piecemeal or point-wise security solutions.

FIG. 1 illustrates an embodiment of security elements. In this embodiment, a security framework 100 includes at least four elements, such elements being network paths 105, products and platforms 110, application security 115, and business processes 120. In an embodiment of the invention, establishment of the network paths 105 and the products and platforms form the initial static security elements. In an embodiment of the invention, application security 115 and business practices 120 form the dynamic elements of security. In an embodiment of the invention, the security framework 100 provides for evaluation of security processes. In an embodiment, the security framework 100 includes feedback to the static security elements.

Figure 2:
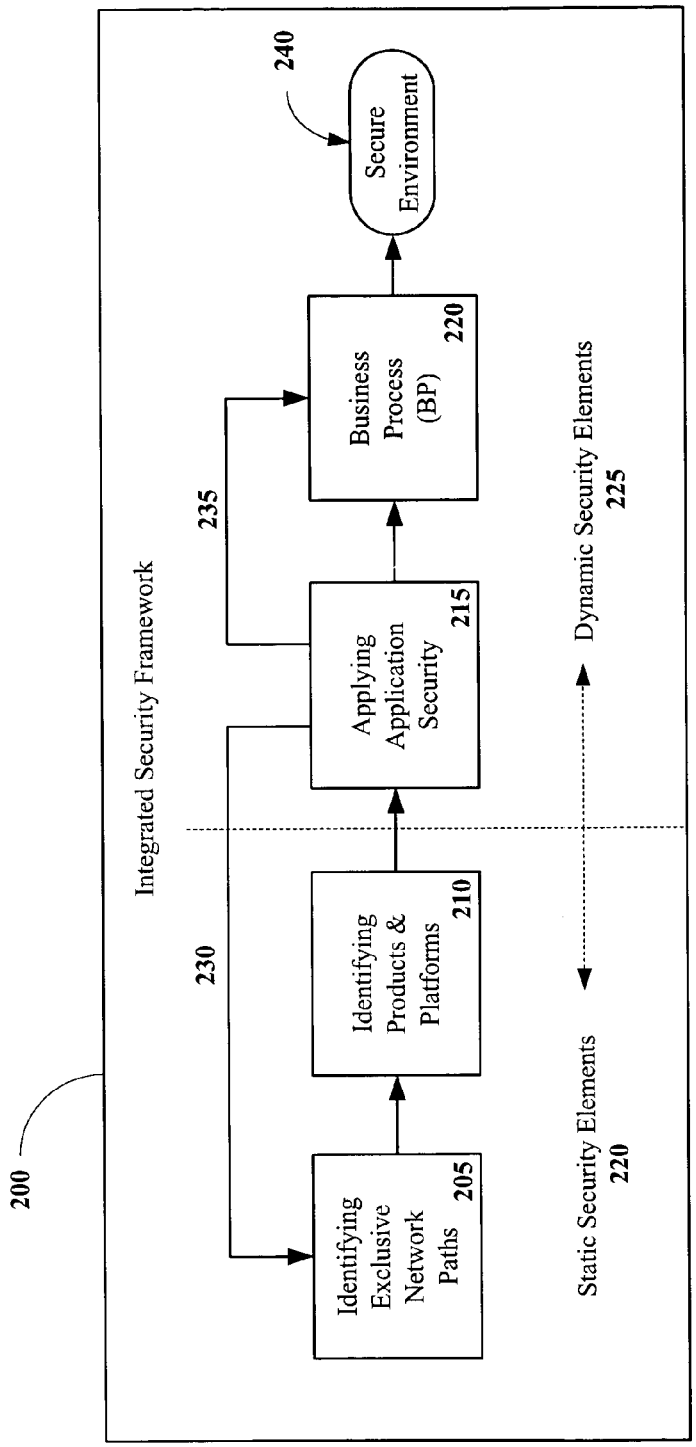
FIG. 2 illustrates an embodiment of operation of security elements for a system.

FIG. 2 illustrates an embodiment of operation of security elements for a system. In this illustration, the flow of operations in a dynamic security environment is shown. A security process may include static security elements 220 and dynamic security elements 225. In an embodiment, the static security elements 220 comprise identifying exclusive network paths 205 and the products and platforms 210. In an embodiment, the dynamic security elements 215 comprise applying application security 215 and institution of business processes 220. Under an embodiment, the establishment of security system for a system may commence with identification of exclusive network paths 205. In this element, there are determinations regarding what networks paths are to be used for a system. In one example, the network paths element 205 may include a determination regarding what paths a particular user should or should not use in accessing a particular piece of equipment.

The establishment of a security system may continue with identifying products and platforms for the system 210. Included in such element is determination whether the products and platforms are up-to-date and are appropriate for the security needs of the system. Upon initial completion of the static security element 220, the framework provides for applying application security 215. There is then a determination whether security is adequate. If security changes are needed in the static security elements 220, the feedback mechanism 230 is used to effect the needed changes. Under an embodiment, the feedback 230 includes automatic modifications in the static security elements 220. Following the application security 215, there is the institution of business practices 220, which is largely a human element. In an embodiment, the process of applying application security 215 may include a feed forward mechanism 235 that provides data from the first three security components regarding business processes 220. Under an embodiment, the feed forward mechanism 235 for business processes includes automatic recommendations to human operators regarding business practices that should be implemented to shore up security for the system. With the implementation of the security elements, the intended result is a secure environment 240.

Figure 3:
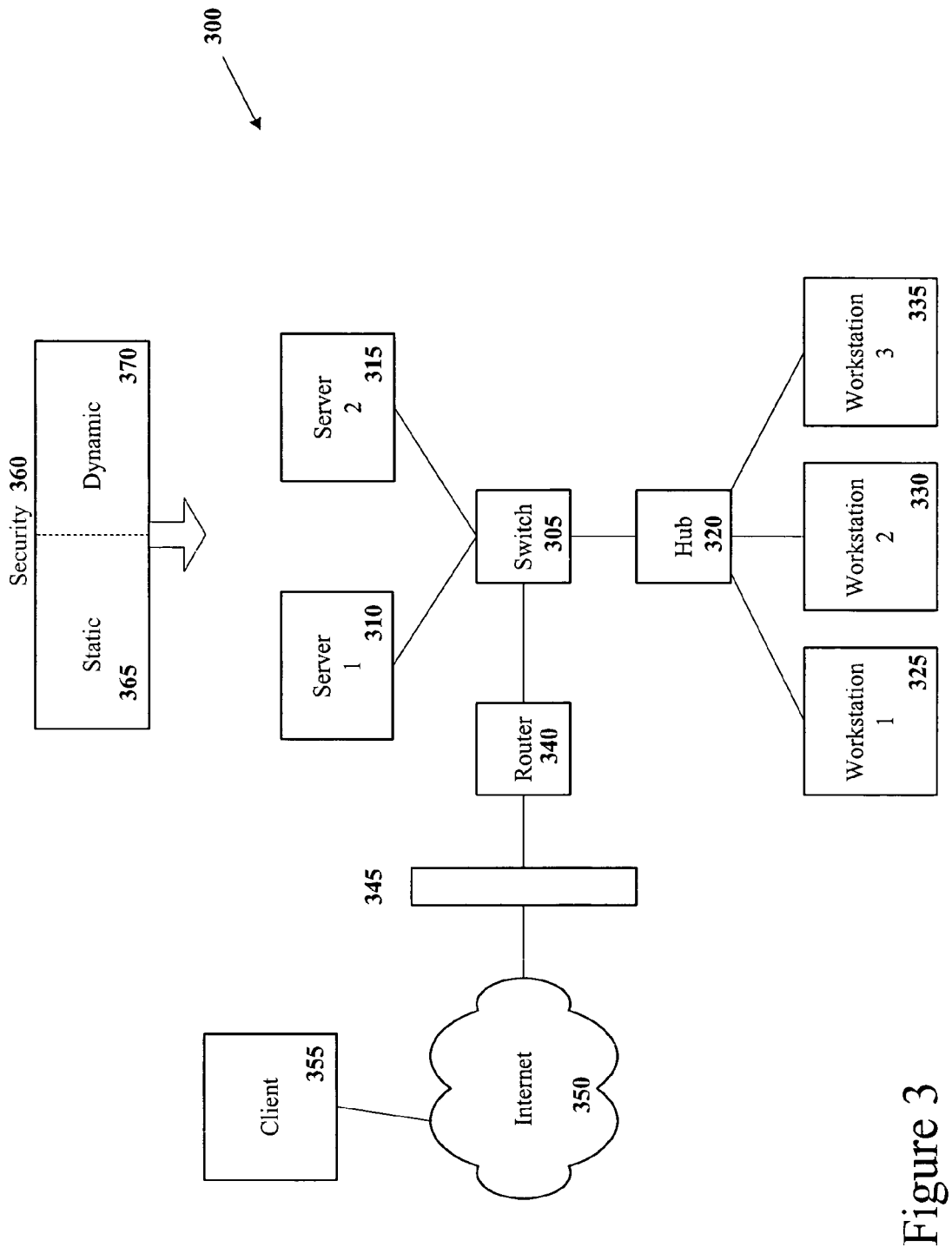
FIG. 3 illustrates an embodiment of a computer network including an integrated security framework.

FIG. 3 illustrates an embodiment of a computer network including an integrated security framework. Under an embodiment of the invention, the network includes an integrated security framework. Networks may be comprised of widely varying components, with FIG. 3 providing one simplified example. Networks may be classified according to their geographical area, such as a local area network (LAN), metropolitan area network (MAN), or wide area network (WAN). In its simplest form, a network comprises two or more computers and associated devices that are linked together with some version of communications equipment. Network connections may be established using varying technologies, including twisted-pair wiring, coaxial cable, fiber-optic cable, and radio signals, and may utilize various connectors or devices such as NICs (network interface cards).

In this illustration, a network 300 may include one or more hubs, hubs being common connection points for devices in a network. In this illustration, a hub 305 is connected to one or more servers, shown as server 1 310 and server 2 315. (Certain network topologies do not include a designated server.) In addition, a hub 320 is connected to multiple workstations, shown as workstation 1 325, workstation 2 330, and workstation 3 335. The network 300 may also include one or more routers, such as router 340. Routers are devices to forward packets of data, such as in a connection between two networks. In FIG. 3, hub 305 and hub 320 are connected with the router 340. In this illustration, the router 340 also connects the network 300 with the Internet 350, although the connection could be to any other network. The network 300 may include various security devices, including a firewall 345 to protect the network from intrusion. In general, a firewall is hardware, software, and/or procedures intended to prevent unauthorized access to or operation on a network. In FIG. 3, a client 355 may access the network 300 through the Internet 350.

Under an embodiment of the invention, the network 300 includes an integrated security framework 360. In an embodiment, the security framework 360 includes a static security sector 365 and a dynamic security sector 370. In an embodiment, the security framework 360 may include processes for establishing security for the access of the client 355 to the network 300. Under an embodiment, the static security sector 365 is established for the network 300. Under an embodiment, the dynamic security sector 370 is then established. The dynamic security 370 also analyzes the security status of the network 300 and provides feedback regarding the static security sector 365 based at least in part on the analysis.

Figure 4:
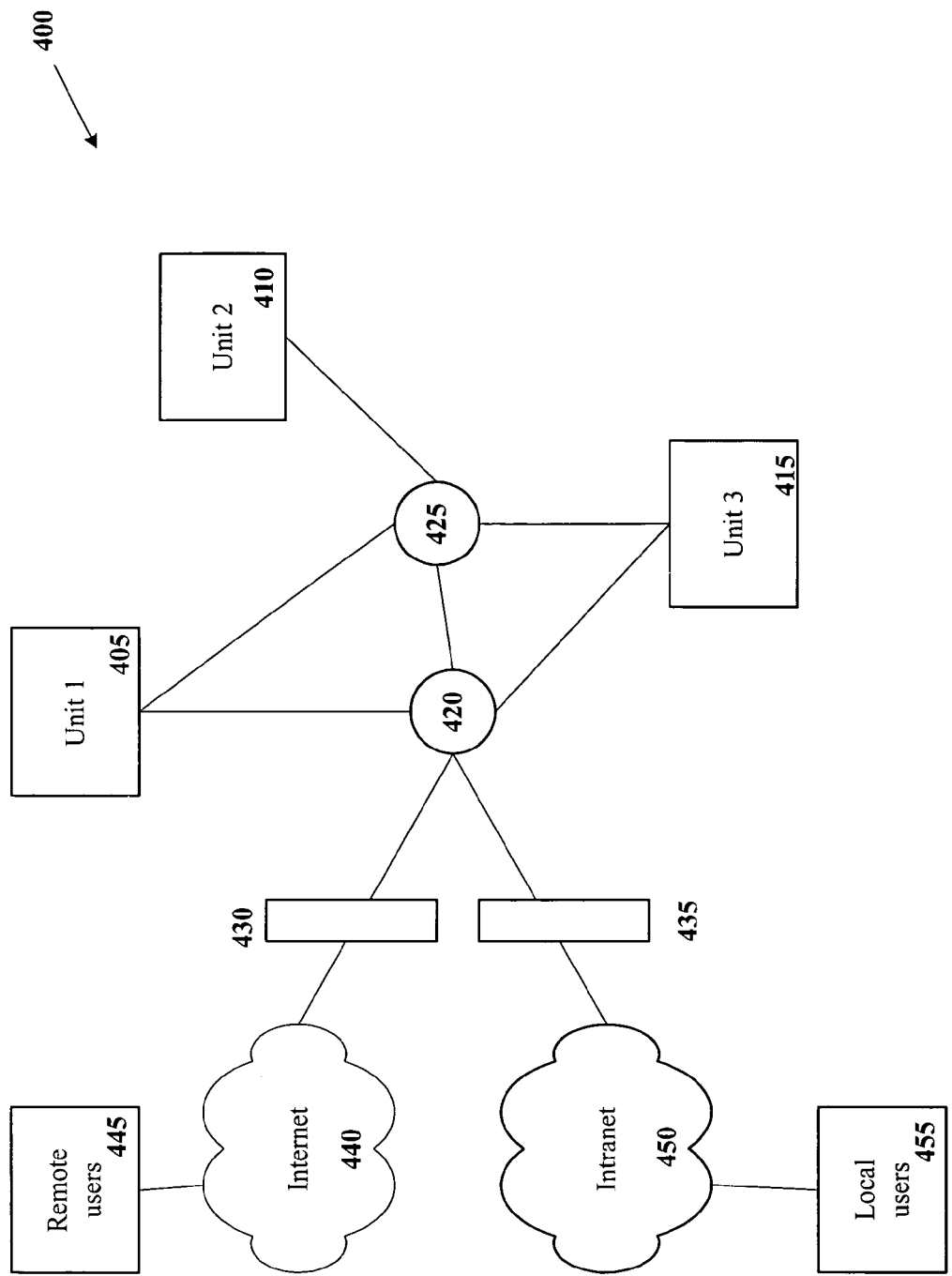
FIG. 4 is an illustration of integrated security in a manufacturing environment.

FIG. 4 is an illustration of integrated security in a manufacturing environment. In this illustration, a manufacturing system 400 may include the manufacturing of semiconductors. The manufacturing system 400 may include multiple process units, including a unit 1 405, a unit 2 410, and a unit 3 415. Users of the process units may include both remote users 445, shown as accessing the manufacturing system 400 through the Internet 440, and local users 455, shown as accessing the manufacturing system 400 through a local intranet 450.

Under an embodiment of the invention, the establishment of security for the manufacturing system 400 includes identifying network paths for the system. In this simplified illustration, multiple paths may be followed to reach the process units. For example, unit 1 405 may be reached via a first node 420 (representing a switch, router, hub, or other such device), or via the first node to a second node 425. The security process may include identifying which network paths will be used for process units. Under an embodiment of the invention, the establishment of security for the manufacturing system 400 further includes identifying products and platforms for the manufacturing system 400. For example, the products may include firewalls for security, shown as a firewall 430 for access from the Internet 440, which then connects to the local intranet 450.

Under an embodiment of the invention, the establishment of security for the manufacturing system 400 includes identifying and establishing application security for the manufacturing system 400. Under an embodiment, the establishment of security further includes analyzing the security status of the manufacturing system 400 and providing feedback for improvements in security. For example, if modifications in usage or network paths change security concerns, the feedback may be provided regarding the network paths and the products and platforms. In an embodiment of the invention, the establishment of security includes automatically identifying changes to the network paths and the products and platforms for the manufacturing system 400. In an embodiment of the invention, the establishment of security further includes automatically implementing identified changes to the network paths and the products and platforms for the manufacturing system 400.

Under an embodiment of the invention, the establishment of security for the manufacturing system 400 includes establishing business practices, which may have great impact on overall security. In an embodiment of the invention, the establishment of security includes automatically identifying changes to the business practices to improve security for the manufacturing system 400. In an embodiment of the invention, the establishment of security further includes automatically providing notice to human operators of the manufacturing system 400 regarding suggested changes in business practices.

Figure 5:
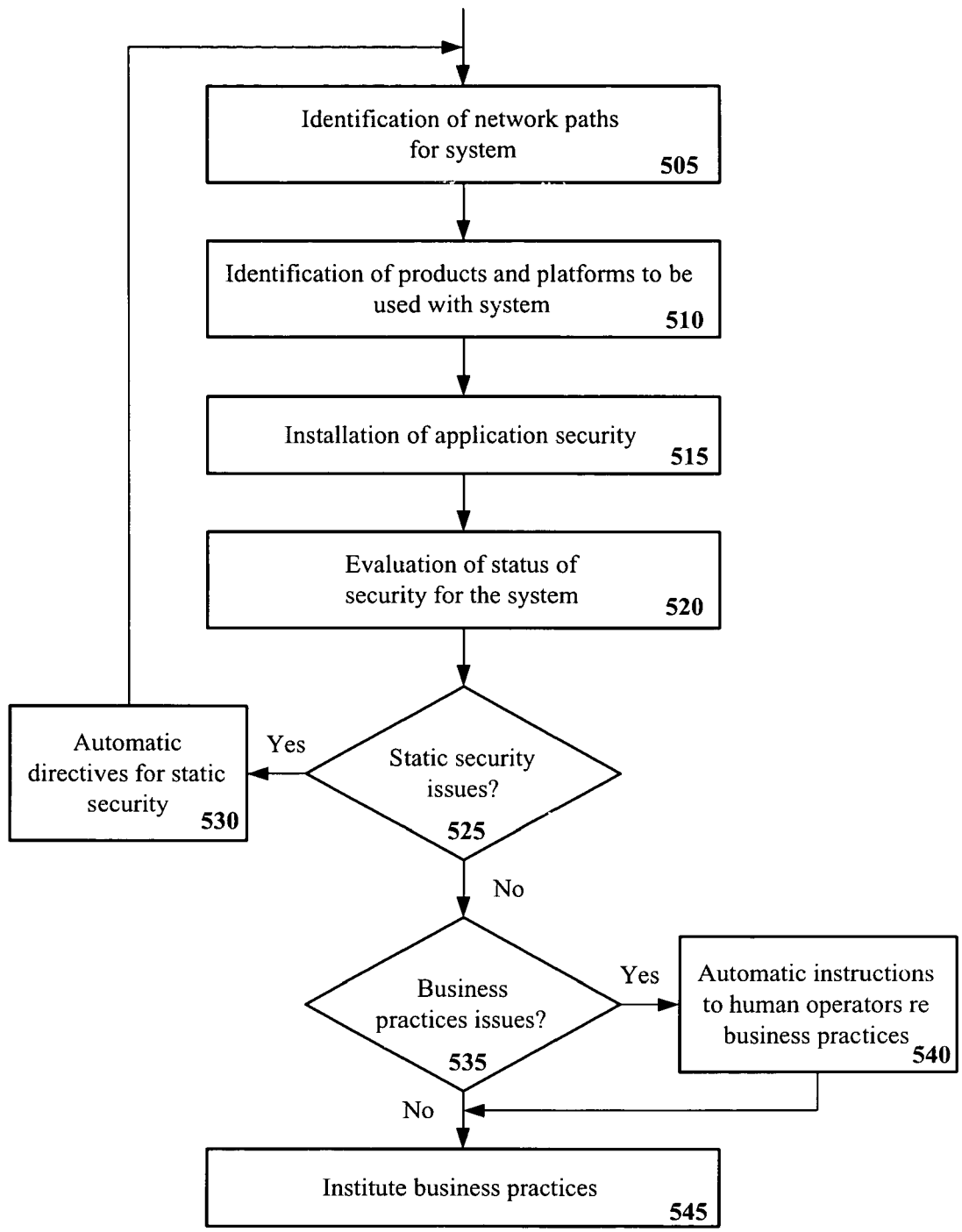
FIG. 5 is a flow chart to illustrate an embodiment of security operations for a system.

FIG. 5 is a flow chart to illustrate an embodiment of security operations for a system. In this illustration, there is an identification of network paths for a system 505. There is also identification of products and platforms to be used with the system 510. The network paths and the products and platforms are "static" elements of the security for the system. These elements are then followed by the installation of application security in connection with operation of the system 515. With the initial security in place, there is an evaluation of the status of security for the system 520. Under an embodiment of the invention, if the evaluation of the status of security for the system indicates that there are issues regarding static security 525, automatic directives for changes in static security, based at least in part on the analysis, are generated 530 and the system feed back to the static security elements. This process may be an iterative operation to continue making adjustments until the system is sufficiently secure. Under an embodiment of the invention, if the evaluation of the status of security for the system indicates that there are issues regarding business practices 535, automatic instructions to human operators regarding business practices are generated 540. The business practices for the system are then instituted 545.

Figure 6:
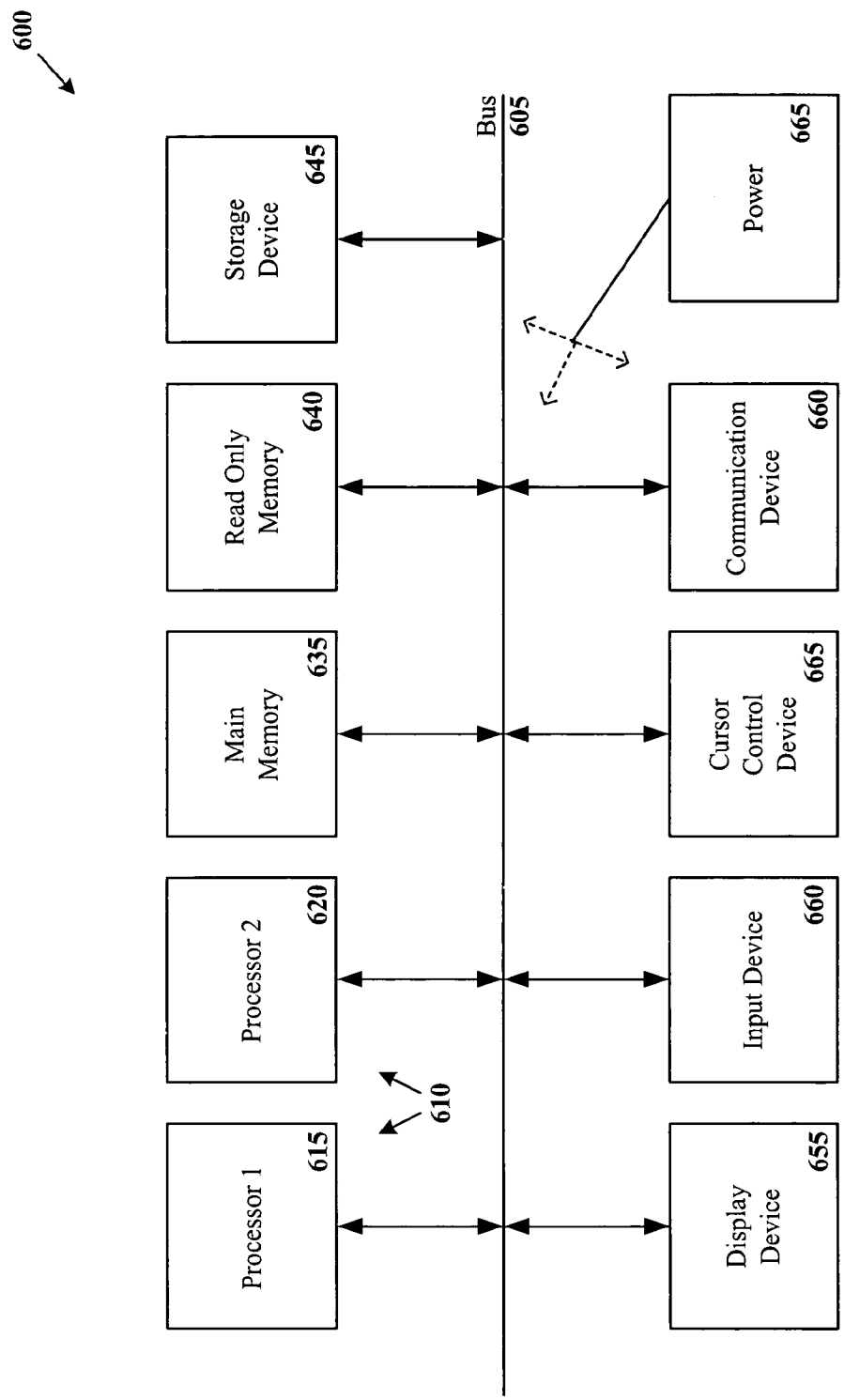
FIG. 6 is block diagram of an embodiment of a computer system that may be included in an integrated security environment.

FIG. 6 is block diagram of an embodiment of a computer system that may be included in an integrated security environment. Under an embodiment of the invention, a computer 600 comprises a bus 605 or other communication means for communicating information, and a processing means such as two or more processors 610 (shown as a first processor 615 and a second processor 620) coupled with the first bus 605 for processing information. The processors may comprise one or more physical processors and one or more logical processors.

The computer 600 further comprises a random access memory (RAM) or other dynamic storage device as a main memory 635 for storing information and instructions to be executed by the processors 610. Main memory 635 also may be used for storing temporary variables or other intermediate information during execution of instructions by the processors 610. The computer 600 also may comprise a read only memory (ROM) 640 and/or other static storage device for storing static information and instructions for the processor 610.

A data storage device 645 may also be coupled to the bus 605 of the computer 600 for storing information and instructions. The data storage device 645 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 655, such as a cathode ray tube (CRT) display, a liquid crystal display (LCD), or other display technology, for displaying information to an end user. In some environments, the display device may be a touch-screen that is also utilized as at least a part of an input device. In some environments, display device 655 may be or may include an auditory device, such as a speaker for providing auditory information. An input device 660 may be coupled to the bus 605 for communicating information and/or command selections to the processors 610. In various implementations, input device 660 may be a keyboard, a keypad, a touch-screen and stylus, a voice-activated system, or other input device, or combinations of such devices. Another type of user input device that may be included is a cursor control device 665, such as a mouse, a trackball, or cursor direction keys for communicating direction information and command selections to the one or more processors 610 and for controlling cursor movement on the display device 665.

A communication device 670 may also be coupled to the bus 605. Depending upon the particular implementation, the communication device 670 may include a transceiver, a wireless modem, a network interface card, or other interface device. The computer 600 may be linked to a network or to other devices using the communication device 670, which may include links to the Internet, a local area network, or another environment. The computer 600 may also comprise a power device or system 675, which may comprise a power supply, a battery, a solar cell, a fuel cell, or other system or device for providing or generating power. The power provided by the power device or system 675 may be distributed as required to elements of the computer 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in computer-readable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable storage medium having stored thereon instructions, which may be used to program a computer (or other electronic devices) to perform a process according to the present invention. The computer-readable storage medium may include, but is not limited to, floppy diskettes, optical disks, CD-ROMs (compact disk read-only memory), magneto-optical disks, ROMs (read-only memory), RAMs (random access memory), EPROMs (erasable programmable read-only memory), EEPROMs (electrically-erasable programmable read-only memory), magnet or optical cards, flash memory, or other type of computer-readable storage medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method executing on hardware comprising:
   identifying exclusive network paths between a system and users of the system;
   identifying products and platforms in use for the system;
   applying application security for the system;
   analyzing a security status for the system based on the exclusive network paths, system products and processes, and application security;
   based at least in part on the analysis of the security status, automatically identifying changes for the exclusive network paths for the system wherein the identifying changes in the exclusive network paths includes determining what paths a particular user should use in accessing a particular piece of equipment; and
   automatically instituting the identified changes.

2. The method of claim 1, further comprising repeating the analysis of the security status of the system and the identification of changes.

3. The method of claim 1, further comprising automatically identifying changes to business practices to increase security for the system based at least in part on the analysis of the security status.

4. The method of claim 3, further comprising automatically providing suggestions to human operators of the system regarding the identified business practices in response to the analysis of the security status.

5. The method of claim 1, wherein the system is a network.

6. A security system for an enterprise comprising:
a processor for processing information, operations of the processor to processing of information regarding security of the enterprise;
a computer memory, the computer memory to include storage of computer applications;
a component for identifying exclusive network paths for the enterprise between a system and users of the system;
a component for identifying products and platforms in use for the enterprise; and
a component for applying application security for the enterprise and for analyzing the security status of the enterprise based on the exclusive network paths, system products and processes, and application security;
the component for applying application security and analyzing security status to:
automatically identify security issues and provide feedback to the component for identifying network paths or the component for identifying products and platforms based at least in part on the identified security issues, the feedback including automatically identifying changes for the exclusive network paths for the system wherein the identifying changes in the exclusive network paths includes determining what paths a particular user should use in accessing a particular piece of equipment; and
automatically institute the identified changes.

7. The security system of claim 6, further comprising a component for automatically identifying and instituting business practices to increase security for the enterprise based at least in part on the analyzed security status.

8. The security system of claim 7, wherein the security system is to automatically notify human operators connected with the enterprise regarding the identified business practices.

9. The security system of claim 6, wherein the enterprise comprises a manufacturing enterprise.

10. The security system of claim 9, wherein the manufacturing enterprise includes semiconductor manufacturing.

11. A manufacturing system comprising;
one or more process units, the process units to be accessed by a plurality of users; and
a security system for the process units, the security system including:
a processor for processing information, operations of the processor to processing of information regarding security of the enterprise;
a static security sector, the static security sector including a component for identification of exclusive network paths between the process units and users, and a component for identification of products and platforms, the component for identification of products and platforms to identify products and platforms to be used in connection with access to the process units by the users, and
a dynamic security sector, the dynamic security sector analyzing the status of the security system and providing feedback to the static security sector, the dynamic security sector including a component for applying application security, the component for applying application security to establish application processes for the users with regard to use of the process units, wherein the security system is to automatically institute changes in the exclusive network paths based at least in part on the analysis of the status of the security system, wherein the changes in the exclusive network paths includes determining what paths a particular user should use in accessing a particular piece of equipment.

12. The manufacturing system of claim 11, wherein the dynamic security sector further comprises a component for business practices.

13. The manufacturing system of claim 12, wherein the dynamic security sector is to automatically identify changes to business practices to increase security for the system based at least in part on the analysis of the status of the security system.

14. A computer-readable storage medium having stored thereon data representing sequences of instructions that, when executed by a processor, cause the processor to perform operations comprising:
identifying exclusive network paths between a system and users of the system;
identifying products and platforms in use for the system;
applying application security for the system;
analyzing a security status for the system based on the exclusive network paths, system products and processes, and application security;
based at least in part on the analysis of the security status, automatically identifying changes for the exclusive network paths for the system wherein the identifying changes in the exclusive network paths includes determining what paths a particular user should use in accessing a particular piece of equipment; and
automatically instituting the identified changes.

15. The medium of claim 14, wherein the instructions further comprise instructions that, when executed by a processor, cause the processor to perform operations comprising repeating the analysis of the security status of the system and the identification of changes.

16. The medium of claim 14, wherein the instructions further comprise instructions that, when executed by a processor, cause the processor to perform operations comprising automatically identifying changes to business practices to increase security for the system based at least in part on the analysis of the security status.

17. The medium of claim 16, wherein the instructions further comprise instructions that, when executed by a processor, cause the processor to perform operations comprising automatically providing suggestions to human operators of the system regarding the identified business practices in response to the analysis of the security status.

18. The medium of claim 14, wherein the system is a network.

* * * * *